Figure 1:
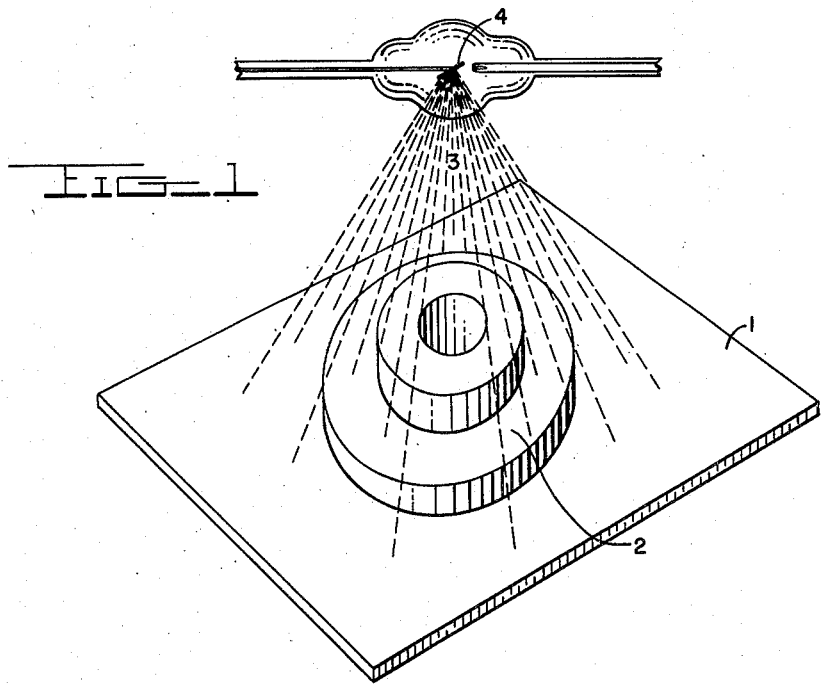

Oct. 10, 1950    J. H. SCHULMAN ET AL    2,524,839
X-RAY SENSITIVE SCREEN
Filed May 27, 1948

INVENTORS
JAMES H. SCHULMAN
LYLE W. EVANS
BY ROBERT GINTHER
ATTORNEY

Patented Oct. 10, 1950

2,524,839

UNITED STATES PATENT OFFICE 2,524,839

X-RAY SENSITIVE SCREEN

James H. Schulman, Washington, D. C., Lyle W. Evans, Emporium, Pa., and Robert Ginther, Washington, D. C.

Application May 27, 1948, Serial No. 29,606

9 Claims. (Cl. 250—65)

(Granted under the act of March 3, 1883, as amended April 30, 1928; 370 O. G. 757)

This invention relates to the use of non-photographic chemical materials in the detecting and recording of high-frequency radiation, such as X-ray and gamma ray radiation, and their application to radiography and diffraction.

Certain materials, generically referred to as "phosphors," have been widely used in X-ray work for this purpose in conjunction with photographic plates or film.

In this latter capacity they emit actinic radiation as a direct result of simply being irradiated with X-rays and thereby augment the photochemical reduction brought about as primarily a function of the X-rays. Thus they act as "intensifiers" in that they reduce the amount of X-ray energy required for adequate film blackening and consequently the requisite exposure time or tube current. It may be pointed out that the phenomenon here involved is properly referred to as "fluorescence," rather than "phosphorescence" even though the radiation emitted is not necessarily visible. This is because the "luminescence" (broad usage) continues only during the period of exposure to X-rays, whereas "phosphorescence" is a phenomenon operative after the primary radiation has ceased.

Another example of a "phosphor" is the "fluoroscopic screen" which is made of a closely related luminescent material differing only in that it emits radiation falling within the visible range of the spectrum and thus does away with the need for a photographic operation when only observation is desired.

Some phosphor materials after treatment with X-rays exhibit to varying degrees a true phosphorescence or after-glow in either the visible or invisible range. Recently phosphors have been developed in which the after-glow (which happens to be visible) can be retained for a considerable period of time, particularly at low temperatures. The rate of radiation of these phosphors is increased by raising the temperature and also by subjecting the material to infra-red radiation.

It is seen that the prior art of phosphor materials is limited to cases where the luminescence is the direct result of the primary irradiation, whether said luminescence be concurrent with (fluorescent) or subsequent to (phosphorescent) said radiation. In other words the phenomenon of luminescence follows immediately and necessarily as a result of the original excitation, and any effect of further treatment of any kind is one affecting only the rate of luminescent decay.

The present invention involves, on the other hand, not a process for accelerating the emission of absorbed radiant energy, but rather for permanently altering the physical nature of the affected materials (to which we shall apply, broadly, the term "phosphors") by means of one type of radiation in such a way that their characteristics under certain radiations are clearly altered.

It is the general object of this invention to provide a method for detecting by means of one type of radiation the permanent changes brought about in certain phosphor materials by means of another type of radiation.

Another object is to provide a method of permanently affecting certain phosphor materials by X-ray or gamma ray radiation so that the effect can at any later time be detected and brought out by subsequent ultra-violet radiation treatment.

It is the particular object of the invention to provide a new and improved radiographic or diffraction technique wherein certain non-photographic phosphor materials can be permanently affected by X-rays or gamma ray radiation, differentially, according to the intensity of the transmitted or diffracted ray, so as to form a "shadowgraph" (radiographic image) or diffraction pattern on the affected phosphor material, and subsequently irradiating said material with a given ultra-violet radiation to bring out said shadowgraph or pattern through visible fluorescence.

The present invention consists in the process of treating certain phosphor materials with high-frequency radiation having a wave length between 0.001 Å. and 500 Å. such as X-rays or gamma rays, and thereby rendering them luminescent (fluorescent) in the visible range upon subsequent radiation treatment with ultra-violet radiation of a certain wave length, said materials being non-luminescent under said ultra-violet radiation prior to exposure to said high-frequency radiation; in other words, the process for creating "ultra-violet luminescent responsivity" by means of X-rays. In all cases the luminescence under ultra-violet radiation is visible and immediate (visibly fluorescent).

In our co-pending application, Serial No. 29,607, filed of even date herewith, now Patent 2,506,749, we have disclosed a type of phosphor material and a technique embodying its usage, in which ultra-violet responsivity is destroyed by treatment with X-rays. Whether or not a material is originally luminescent or non-luminescent under ultra-violet radiation may depend on the wave length of said radiation. Thus, it is necessary to know the effect of a particular ultraviolet radiation on a particular phosphor prior to its exposure to X-irradiation, and to bring out the effect of said irradiation with the same ultraviolet radiation after exposure. Although there is probably for every phosphor, an optimum ultra-violet wave length at which the intensity of contrast is a maximum, any radiation under which an appropriate phosphor is originally non-luminescent (as in this application) or luminescent (as in our co-pending application) is operative.

The phosphor or special material used in this process is a solidified solution consisting of a host material (solvent) and an activator (solute). The preferred activator is simply a salt of silver, e. g., silver chloride, or more specifically, the silver ion, Ag+. The host material may be either a salt, in which case a true "solid solution" (mixed crystal) is formed, or a "glass" in which case the solution is really a highly viscous (solidified) liquid. Specific examples of host materials includes sodium chloride, sodium bromide, potassium chloride, sodium sulfate, barium chloride and (aluminum phosphate) glass.

The material is best prepared by fusion of a mixture of the host and activator materials and subsequent solidification. If water-soluble components are used the phosphor material may be prepared by precipitation from a concentrated aqueous solution. The resulting solid solution or glass is ground mechanically (unless prepared by precipitation) to a fineness in the order of 200–300 mesh and applied with glue to a cardboard or plastic screen backing. The relative quantities of silver salt and other salts or glasses are not critical, as long as the silver is kept below the quantity which will cause the material to be originally fluorescent under the ultra-violet to be used. For example, under ultra-violet 3650 Å., a preferred radiation, the phosphor is fluorescent inherently if silver is present in more than 4 mol percent. The existence of silver ions in some foreign solid solvent material is the only essential feature of the phosphor material.

In the case of the mixed crystal type material for example silver chloride in sodium chloride, it is believed that the silver ions occupy the positions of sodium ions in the parent sodium chloride crystal lattice. Under the effect of X-rays or gamma rays an electron probably shifts from a chloride ion to a silver ion resulting in two free atoms frozen in position in the sodium chloride crystal lattice. The thus frozen silver atom has somewhat the nature of a metal gas (for example mercury vapor) and will appear luminescent under the action of ultra-violet radiation. Part of the invention consists in the reduction by radiation of the dispersed silver ions to dispersed silver atoms.

Figure 2:
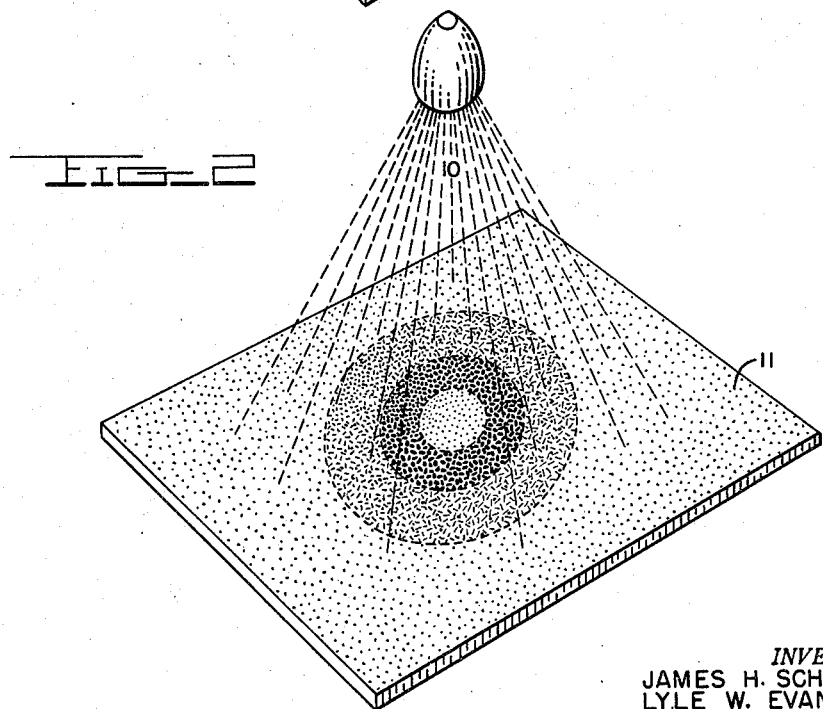

As an illustration of one way in which the process may be carried out the accompanying drawings are shown and the following operation is described:

A mixture of 50 parts of NaCl and one part of AgCl is fused and allowed to solidify. Then this phosphor is ground to a fine powder and applied to a suitable mounting material. If the screen is now examined under ultra-violet radiation, for example 3650 Å., it will be non-luminescent. It is then placed in the film position 1 in a radiographic assembly, Fig. 1, arranged for example, to X-ray a steel flange 2, and high-frequency radiation 3 such as from a tungsten target 4 operating at 30 k. v. (0.5–1.0 Å.) is directed toward and through the casting. After exposure the phosphor screen is again examined, Fig. 2, under ultra-violet radiation 10 of wavelength 3650 Å., and it is observed that the screen 11 is somewhat visibly luminescent, and with an intensity of luminescence proportional to the degree of X-ray exposure. Of course, the practical value of such a technique lies in detecting differences in density in the X-rayed object such as result from internal defects, rather than differences in thickness.

The wave length of the ultra-violet radiation, is of course, not critical and the effect will be observed under any wavelength at which the material was originally non-luminescent.

The above example is intended to be illustrative only and not limitative of the invention except to the extent as defined in the herewith appended claims.

It may be pointed out that the temperature, except at inordinately high levels, has no effect on the radiation properties of this phosphor screen and that it may be kept indefinitely without any decay in the luminescence. Furthermore, there is no decay in luminescence even during continued exposure to the ultra-violet radiation. It is these last mentioned features which particularly demonstrate the essence of the invention.

The invention herein described may be made and used by or for the Government of the United States of America for governmental purposes without the payment of any royalties thereon or therefor.

What is claimed is:

1. In apparatus for preparing an invisibly permanent and visibly fluorescent image of a pattern of radiation, the combination of, a phosphor screen comprising a finely divided solid solution of a silver salt, said solution being rendered nonresponsive to ultra violet radiation of approximately 3650 Å. by limiting it to less than about 4 mol percent silver, a source of radiation wave-length between 0.001 Å. and 500 Å., and a source of ultra-violet radiation approximately 3650 Å. in wave-length.

2. The method of creating in a phosphor material composed of a solid solution of a silver salt of less than four mol percent silver, permanent luminescent responsivity to ultra violet radiation of approximately 3650 Å., which comprises temporarily subjecting said solution to a radiation of wave length between .001 Å. and 500 Å.

3. The method of forming a phosphor material having phosphorescent responsivity to an ultra violet radiation of a wave length of approximately 3650 Å., which comprises forming a solid solution of fifty parts sodium chloride and one part silver chloride, and then temporarily subjecting the same to X-ray radiation of 1.5 Å.

4. The method of forming a phosphor material having permanent luminescent responsivity to a given ultra violet radiation, which comprises forming a solid solution of a silver salt in which the solid solution is given a silver content below that required for luminescent responsivity to said given ultra violet radiation and temporarily subjecting said material to radiation of wave length between .001 Å. and 500 Å. to render the material responsive to said given radiation.

5. The method of increasing the wave length to which a phosphor material originally containing dispersed silver ions is excited to luminescence, which comprises reducing the silver ions to silver atoms by temporarily subjecting the material to radiation of wave lengths between .001 Å. and 500 Å.

6. The method of forming on a screen a fluorescent image, which comprises forming a screen of a host material having an activator of silver in an amount just insufficient to render the composition responsive to ultra violet radiation of a given wave length, then temporarily subjecting different areas of the screen to different intensities of X-ray radiation of a wave length of 0.001 Å. to 500 Å. to render said different areas of the screen permanently responsive to said ultra violet radiation in degree proportional to the intensity of said X-ray exposure, discontinuing the X-ray exposure, and then maintaining irradiation of the screen with ultra violet radiation of said given wave length.

7. The method of forming a phosphor screen differentially responsive in different given areas to ultra violet radiation of a given wave length, which comprises forming the screen of a compound of a host material activated with silver in an amount substantially less than the amount required to render the composition fluorescent to ultra violet radiation of said given wave length, and thereafter temporarily subjecting the screen to X-ray radiation of different intensities in said different given areas.

8. The method of forming a phosphor screen differentially responsive in different given areas to ultra violet radiation of 3650 Å., which comprises forming the screen of a compound of calcium chloride with less than four mol percent silver, and thereafter temporarily subjecting said different given areas to different intensities of X-ray radiation.

9. The method of preparing a permanent latent image of a pattern of radiation having a wave length of between .001 Å. and 500 Å. comprising, temporarily subjecting to said pattern of radiation a phosphor screen having a phosphor consisting essentially of a solid solution of silver salt in a glass in which the silver content is slightly less than that required to render the solution responsive to ultra violet radiation of a given wave length, thereby rendering the screen differentially responsive to ultra violet radiation of said given wave length in different portions according to the intensities received by the screen in different portions during subjection to the radiation pattern.

JAMES H. SCHULMAN.
LYLE W. EVANS.
ROBERT GINTHER.

REFERENCES CITED

The following references are of record in the file of this patent:

UNITED STATES PATENTS

| Number | Name | Date |
|---|---|---|
| 1,418,240 | Curie et al. | May 30, 1922 |
| 1,648,058 | Parker | Nov. 8, 1927 |
| 2,074,226 | Kunz et al. | Mar. 16, 1937 |
| 2,099,602 | Fischer | Nov. 16, 1937 |
| 2,306,626 | Huniger | Dec. 29, 1942 |
| 2,360,326 | Adrian et al. | Oct. 17, 1944 |

FOREIGN PATENTS

| Number | Country | Date |
|---|---|---|
| 492,722 | Great Britain | Sept. 26, 1938 |